J. L. BREESE, Jr.
DEVICE FOR LOADING AND UNLOADING VEHICLES.
APPLICATION FILED JAN. 20, 1914.
1,113,191.
Patented Oct. 13, 1914.
2 SHEETS—SHEET 1.
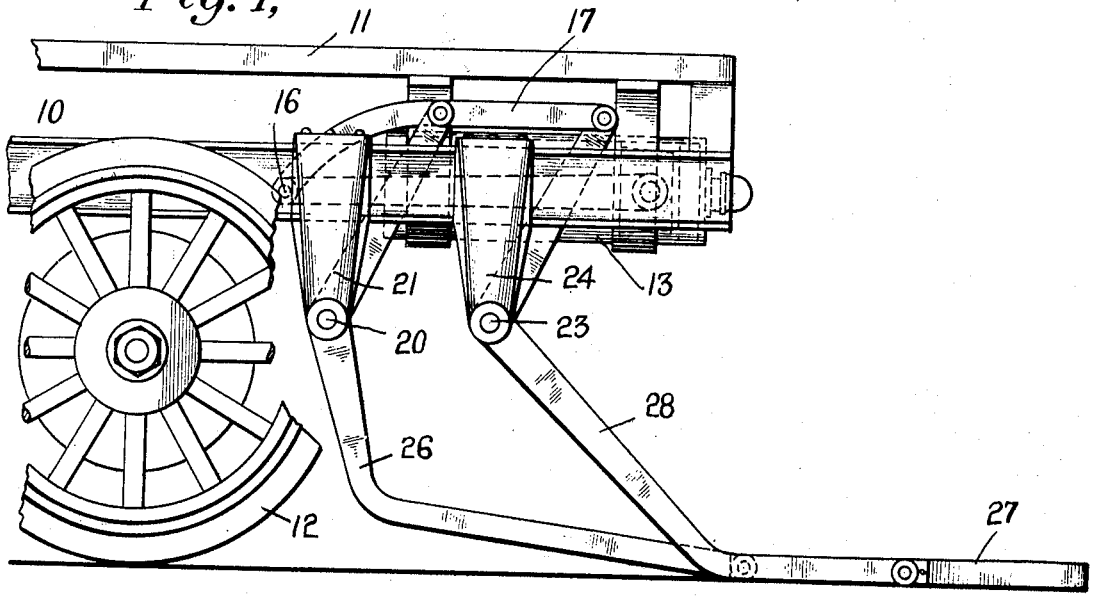
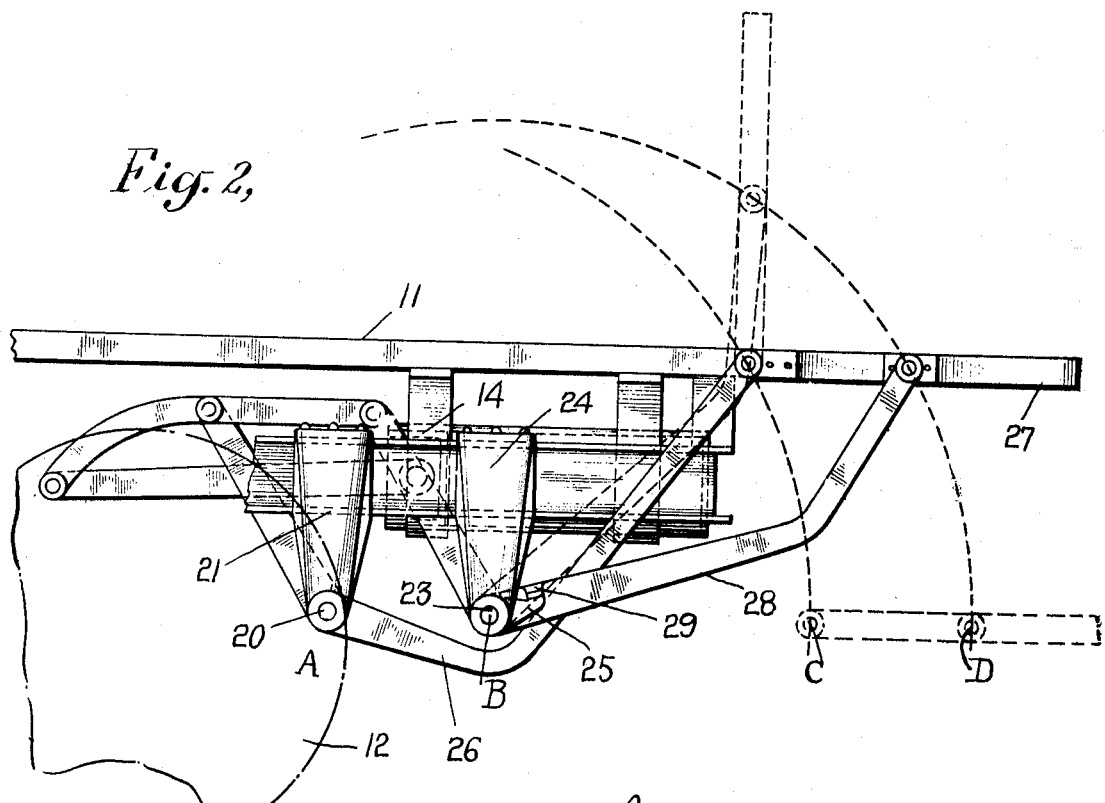

J. L. BREESE, Jr.
DEVICE FOR LOADING AND UNLOADING VEHICLES.
APPLICATION FILED JAN. 20, 1914.
1,113,191.
Patented Oct. 13, 1914.
2 SHEETS—SHEET 2.
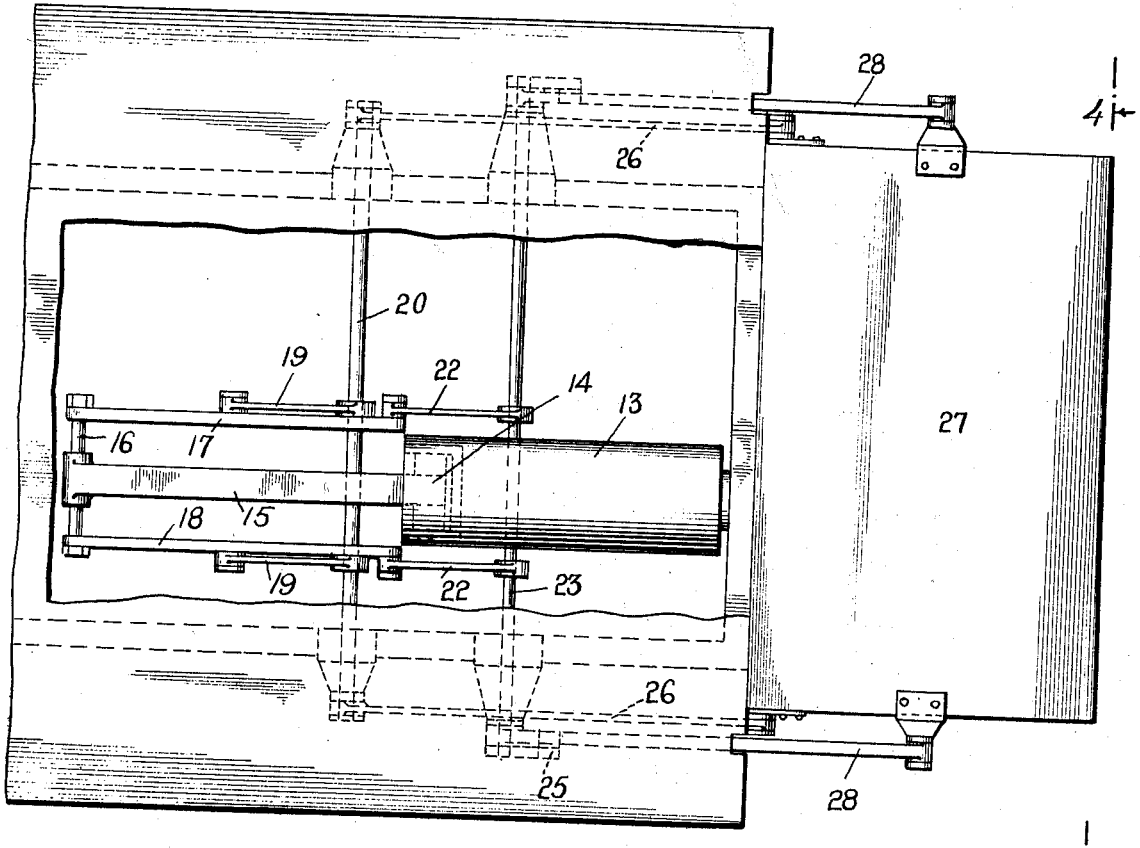
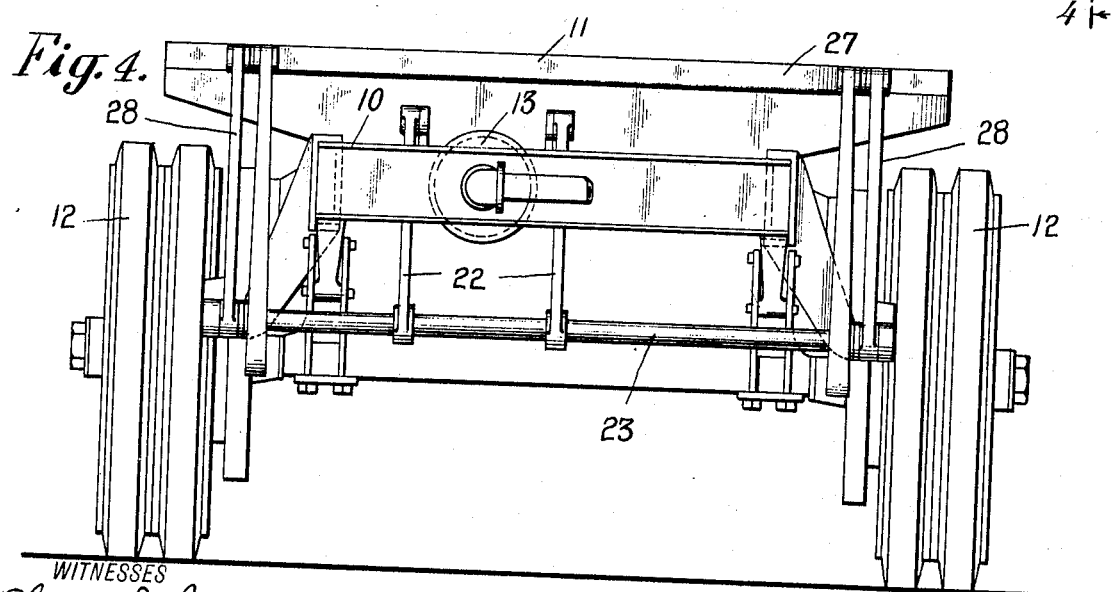

UNITED STATES PATENT OFFICE.

JAMES L. BREESE, JR., OF NEW YORK, N. Y.

DEVICE FOR LOADING AND UNLOADING VEHICLES.

1,113,191.  Specification of Letters Patent.  Patented Oct. 13, 1914.

Application filed January 20, 1914. Serial No. 813,152.

*To all whom it may concern:*

Be it known that I, JAMES L. BREESE, Jr., a citizen of the United States, residing at New York, in the county and State of New York, have invented certain new and useful Improvements in Devices for Loading and Unloading Vehicles, of which the following is a full, clear, and exact description.

The invention which constitutes the subject-matter of this application relates broadly to a hoisting means, and while the same is admirably adapted for elevating freight from the ground to a vehicle and vice-versa, it will be readily understood that it is not confined to this particular use, as it is obvious from the description below that the same may be applied and used with equal effectiveness to stationary bins, granaries, ware-houses, etc. It will be equally obvious that the same can be used to elevate objects to any desired heights and is not limited in this respect to merely raising objects from the ground to the bottom of a vehicle bed as shown.

Another important feature of the invention lies in the fact that during the period of non-use the elevating platform may readily be turned to vertical position and used as an end-gate or tail-board for the rear of the vehicle, or in case of a ware-house, it may be likewise turned to close the opening through which the freight is moved to and from said elevating platform.

Other important features of the invention will appear from the detail description below, taken in connection with the accompanying drawings, in which—

Figure 1 is a side view of the device as applied to a truck showing the parts in the position to raise freight from the ground to the vehicle bed. Fig. 2 is a similar side view, showing the elevating platform in its final position in raising an object from the ground; that is to say, flush with the bottom of the vehicle. This figure also illustrates in dotted lines the position of the platform when the latter is utilized as an end gate or tail-board. Fig. 3 is a top plan view of a truck, illustrating in detail how the invention is applied thereto. Fig. 4 is an end view taken on the line 4—4 of Fig. 3, looking in the direction of the arrows on said section line.

Referring to the drawings in detail, the numeral 10 designates the body of a conventional type of truck, provided with a bed 11 and with suitable running gear, including wheels 12. Suitably supported from the rear end of the vehicle body is a fluid cylinder 13, provided with a piston 14 and a rod 15 projecting from the open end thereof. This rod is connected at its other end to a cross-rod 16 and pivotally connected to the ends of this rod 16 are arms 17 and 18. Pivotally connected to arms 17 and 18 is a pair of links 19, which is rigidly connected to a cross-shaft 20 journaled in suitable bearings provided by a pair of downwardly projecting members 21. A second pair of links 22 is rigidly secured to a cross-shaft 23, journaled in a pair of bearing members 24. This cross-shaft is provided with a pair of stub arms 25, likewise rigidly secured thereto and the functions of which will be presently described. Rigidly secured to the cross-shaft 20 is one of the ends of a pair of elevating arms 26, the other ends of which are pivotally connected to a movable platform 27. Rotatably secured to the cross-shaft 23 is one of the ends of a pair of elevating arms 28, the other ends of which, like the elevating arms 26, are pivotally secured to the movable platform 27.

The operation is as follows: When it is desired to raise an object, it is placed on the platform 27, when it is in the position indicated in Fig. 1, or in any intermediate position. Fluid is admitted behind the piston 14, which forces the same toward the forward end. This, of course, moves the piston rod in the direction of the arrow, which continues until the piston arrives at the position indicated in Fig. 2. This forward movement of the piston rod imparts also a forward movement to the arms 17 and 18, which in turn causes a counter-clockwise movement of the links 19, 19 and 22, 22 (when viewed from the left side of the vehicle) about the axes of the cross-shafts 20 and 23, as centers. These links being fixedly secured, as above described, to said cross-shafts, the latter are simultaneously given a rotative movement in the same direction. This rotation of the shaft 20 immediately imparts a movement of elevating arms 26 about the axis of this shaft as a center, while the positive rotation of the shaft 23 imparts a movement of the arms 25 around the axis of the same as a center. The outer ends of these arms, located as they are in proximity to the elevating arms 28, are so constructed as to contact with a pair of studs 29 projecting from said arms 28. It will therefore be apparent that a positive movement of the arms 25 will cause a simultaneous movement of the elevating arms 28.

From the above described operation of the device, it will obviously appear to those skilled in the art that, so far as the elevation of the platform 27 from the ground to the position in which it is flush with the bed is concerned, the connection between the shaft 23 and the elevating arms 28 may be a duplication of the connection between the shaft 20 and the elevating arms 26. But with a view to utilizing the platform as an end-gate I preferably employ the connection shown, so that the arms 28 may move independently of the movement of the shaft 23 and its stub arms 25.

The reasons why the platform 27 can be moved to be flush with or perpendicular to the bed of the vehicle may be explained as follows: It is understood that the distance between the points A and B (see Fig. 2) is equal to the distance between the points C and D; also the distance between the points A and C is equal to the distance between the points B and D; hence, if lines were drawn to connect these points, they would define a parallelogram. Although the arms 26 and 28 are bent, to all intents and purposes, they operate in their movements exactly the same as if they were straight; that is to say, as if they were the two opposite sides of a parallelogram. Consequently, when the four points A, B, C and D are all in the same plane, the platform can continue its upward movement in two ways. First, the points C and D can move at the same angular speed; in which case the four points of connection, as above described, define at any position a parallelogram; in this way, the device is used to elevate various objects. On the other hand, if the rear of the platform is raised to "break" the parallelogram, the point D will move in a circle of the same radius, but at a greater angular speed, and if the movement be continued, the platform will assume the vertical position, as indicated in dotted lines in Fig. 2. In either case, the rear edge of the vehicle bed is preferably so situated as to arrest any further movement of the platform. When the platform is moved from its upper vertical or horizontal position, it will continue from the position where the points A, B, C and D are in the same plane downward in a horizontal position, for as soon as this intermediate position is reached the lugs 29 thereon contact with the stub arms 25, which, by virtue of the connection previously described, causes the shafts 20 and 23 to rotate positively at the same speed. Arms 26 are preferably arranged to rotate between the arms 28, and it will be understood that they are bent, as shown, so as to enable the same to raise the platform to any position desired without having its movement arrested by contact with the vehicle body or by contact with any of the mechanism comprising my device. The pivotal points A and B are preferably located in the same horizontal plane, or substantially so, in order that the pivotal connections C and D may be made at the sides of the platform 27, whereby the latter will not only be maintained in a horizontal plane during its upward and downward movement, but also to avoid upward and downward projections on the platform which would in the one case be in the way in loading and in the other case would prevent the platform from lying parallel to and against the level of the ground. In both cases, the projections would be objectionable when the platform is used as an end-gate or tail-board.

It is to be understood that I do not limit myself to any particular power mechanism for operating the elevator, but as a matter of illustration I show therein the use of a fluid pressure operated means. Also, that I do not limit myself to the exact mechanism shown, as many changes may be made in point of detail and other embodiments resorted to without necessarily deviating from the true spirit and scope of my invention.

What I claim is:—

1. A device for hoisting freight from the ground to a vehicle bed, comprising pairs of elevating arms one of the ends of each of which is pivotally connected in substantially the same horizontal plane to the vehicle body, a platform to which the other ends of said arms are pivoted in a plane parallel to the aforesaid plane, and means for moving said arms and platform above and below the first mentioned plane.

2. A device for hoisting freight and other articles to a vehicle bed, comprising pairs of elevating arms, one of the ends of each of which is pivotally connected in substantially the same horizontal plane to the vehicle body, a platform to which the other ends of said arms are pivoted in a plane parallel to the aforesaid plane, and means for positively and simultaneously moving each of said arms above and below the first mentioned plane, whereby the platform is raised from and lowered to the ground.

3. A device for raising a platform from the ground to a point where it is substantially flush with the bed of a vehicle, comprising pairs of elevating arms, a cross shaft, one of the ends of each of the said elevating arms being pivotally connected in a horizontal plane to said platform, the other ends of one pair of which are rotatably connected to said cross-shaft, a second cross-shaft the ends of the other pair of elevating arms being rigidly connected to the said second cross shaft in substantially the same horizontal plane with the aforesaid cross-shaft, and means associated with said shafts for positively and simultaneously operating each of said pairs of arms to raise the platform from and lower the same to the ground.

4. A device for raising a platform from the ground to a point where it is substantially flush with the bed of a vehicle, comprising pairs of elevating arms, a cross shaft, one of the ends of each of the said elevating arms being pivotally connected in a horizontal plane to said platform, the other ends of one pair of which are rotatably connected to said cross-shaft, a second cross-shaft, the ends of the other pair of elevating arms being rigidly connected to the said second cross shaft in substantially the same horizontal plane with the aforesaid cross shaft, arms rigidly secured to and projecting from the first mentioned cross shaft and engaging with the first pair of the aforesaid arms, parallel arms rigidly secured to and projecting from each of said cross shafts, and power means for operating the last mentioned arms for raising and lowering the platform.

5. A device for hoisting freight and other articles to a vehicle bed, comprising a platform, pairs of elevating arms, one of the ends of each of which is pivotally connected in substantially a horizontal plane to said platform, and the other ends of said elevating arms pivotally connected in a substantially horizontal plane to said vehicle, and operating means for positively and simultaneously moving each of said arms above and below said last mentioned plane, whereby the platform is raised from and lowered to the ground, one of said pairs of elevating arms movable upwardly independently of the movement of said operating means, whereby the platform is adapted to be utilized as a tail board for the vehicle.

6. A device for hoisting freight and other articles to a vehicle or other bed, comprising a platform, pairs of elevating arms, one of the ends of each of which is pivotally connected in substantially a horizontal plane to said platform, and the other ends of said elevating arms pivotally connected in a substantially horizontal plane, to said vehicle, in combination with means for moving the pivotal points on said platform above and below said last mentioned plane, at the same angular speed, said last mentioned means comprising operating mechanism for positively and simultaneously moving each of said pairs of arms from their lowermost to the uppermost position, one of the pairs of the said arms movable independently of said operating mechanism, whereby the pivotal points on the platform are adapted to move at different angular speeds.

7. A device for hoisting freight and other articles to a vehicle or other bed, comprising a platform, a pairs of elevating arms, one of the ends of each of which is pivotally connected in substantially a horizontal plane to said platform, and the other ends of said elevating arms pivotally connected in a substantially horizontal plane to said vehicle, in combination with means for moving the pivotal points on said platform above and below said last mentioned plane at the same angular speed, said last mentioned means comprising operating mechanism for positively and simultaneously moving each of said pairs of arms from their lowermost to the uppermost position, one of the pairs of said elevating arms rigidly secured to and the other pair adapted to move independently of said operating mechanism, whereby the pivotal points on the platform are adapted to move at different angular speeds.

8. A device for hoisting freight and other articles to a vehicle, comprising a platform, a pair of arms, one of the ends of each of which is pivoted to said platform and the other ends of which are pivoted to said vehicle, a second pair of arms, the ends of which are similarly connected to said platform and to said vehicle, the pivotal points on said vehicle defining a plane which is parallel to the plane defined by the pivotal points on said platform, and one of the pairs of said arms located between the other pair whereby the platform may be moved upwardly and downwardly from the first mentioned plane.

9. A device for hoisting freight and other articles to a vehicle, comprising a platform, a pair of arms, one of the ends of each of which is pivoted to said platform and the other ends of which are pivoted to said vehicle, a second pair of arms, the ends of which are similarly connected to said platform and to said vehicle, the pivotal points on said vehicle defining a plane which is parallel to the plane defined by the pivotal points on said platform, means rigidly connected to one pair of said arms and contacting with but movable independently of the other, whereby the platform is adapted to move in a horizontal plane flush with the truck bed or to a position at right angles to said bed, and means for operating the aforesaid means.

10. A device for hoisting freight and other articles to a vehicle, comprising a platform, a plurality of arms, one of the ends of each of which is pivoted to said platform and the other ends of which are pivoted to said vehicle, the pivotal points on said vehicle defining a plane which is parallel to the plane defined by the pivotal points on said platform, and means for moving said platform upwardly and downwardly from the first mentioned plane.

In testimony whereof I affix my signature in the presence of two subscribing witnesses.

JAMES L. BREESE, Jr.

Witnesses:
M. LAWSON DYER,
THOMAS J. BYRNE.